United States Patent
Barrett

(10) Patent No.: US 6,698,994 B2
(45) Date of Patent: Mar. 2, 2004

(54) MOTORCYCLE LOADING & UNLOADING APPARATUS

(76) Inventor: William C. Barrett, 194 Ford Dr., Choudrant, LA (US) 71227

( * ) Notice: Subject to any disclaimer, the term of this patent is extended or adjusted under 35 U.S.C. 154(b) by 245 days.

(21) Appl. No.: 10/061,728

(22) Filed: Oct. 25, 2001

(65) Prior Publication Data

US 2003/0082034 A1 May 1, 2003

(51) Int. Cl.$^7$ ................................................. B60P 3/06
(52) U.S. Cl. ..................... 414/462; 414/477; 414/480; 414/482; 414/494; 414/537; 414/538
(58) Field of Search ..................... 298/12, 14; 414/462, 414/477, 478, 479, 480, 482, 491, 492, 493, 494, 499, 500, 537, 538

(56) References Cited

U.S. PATENT DOCUMENTS

| | | |
|---|---|---|
| 3,843,001 A | 10/1974 | Willis |
| 4,932,829 A * | 6/1990 | Miller ......................... 414/462 |
| 5,456,564 A | 10/1995 | Bianchini .................... 414/462 |
| 5,462,398 A | 10/1995 | Hymer ........................ 414/462 |
| 5,647,719 A | 7/1997 | Bowlen ....................... 414/462 |
| 5,846,047 A | 12/1998 | Riekki ......................... 414/494 |
| 6,099,232 A | 8/2000 | Dixon et al. ................. 414/494 |
| 6,176,672 B1 | 1/2001 | Egan et al. .................. 414/462 |
| 6,413,033 B1 * | 7/2002 | Monroig, Jr. ................ 414/480 |

* cited by examiner

Primary Examiner—Janice L. Krizek
(74) Attorney, Agent, or Firm—R. Keith Harrison

(57) ABSTRACT

An apparatus for loading and unloading objects, particularly motorcycles, all-terrain vehicles (ATVs) and the like, on a carrying vehicle. The apparatus typically includes at least one vehicle attachment mount arm for engaging the carrying vehicle. A slide bracket is pivotally carried by the vehicle attachment mount arm, and a support having front and rear ends is slidably carried by the slide bracket. A first winch engages the support for selectively sliding the support forwardly or rearwardly on the slide bracket. A carriage is slidably carried by the support for receiving the object. A second winch operably engages the carriage such that the carriage slidably traverses the support toward the front end of the support responsive to a forward operation of the second winch, and the carriage slidably traverses the support toward the rear end of the support responsive to a reverse operation of the second winch. Accordingly, the apparatus is capable of loading a motorcycle on the carrying vehicle, wherein the carriage is adjusted to the rear end of the support, the support is adjusted rearwardly on the slide bracket and the slide bracket pivots rearwardly to rest the rear end of the support on the ground. The carriage receives the motorcycle, and the second winch is operated to advance the carriage forwardly on the support and pull the motorcycle onto the support. The first winch is then operated to slide the support forwardly on the slide bracket and pull the support and motorcycle onto the carrying vehicle as the support pivots forwardly. The motorcycle is unloaded from the vehicle by reversing those steps.

20 Claims, 7 Drawing Sheets

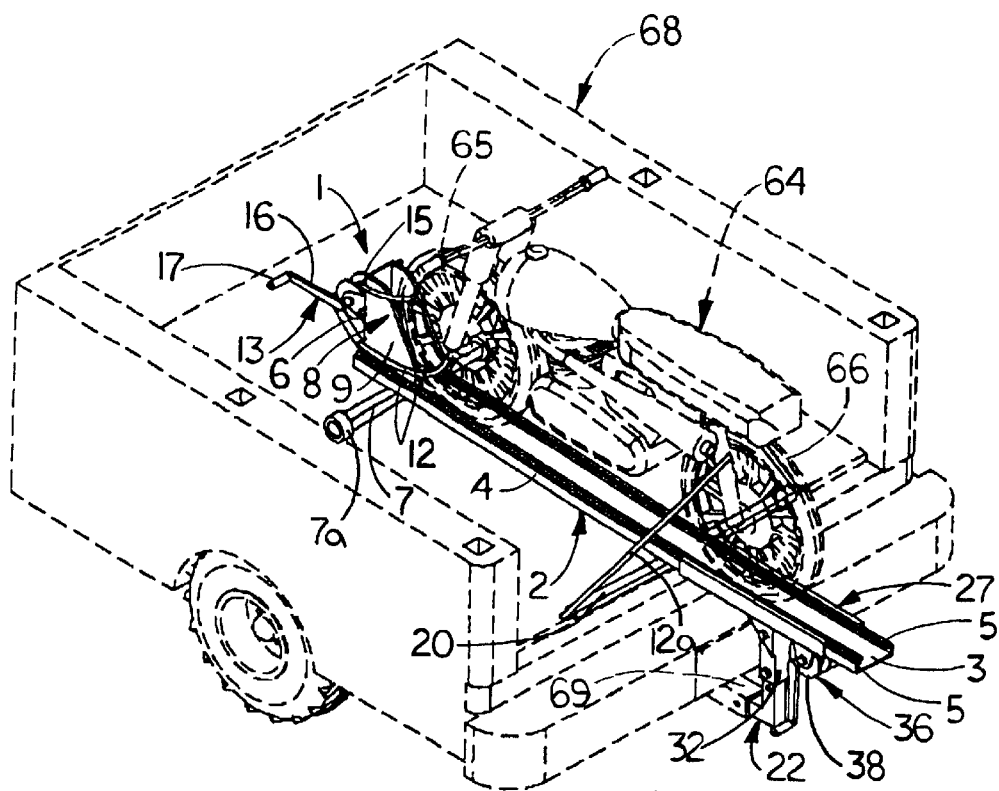
FIG. 1
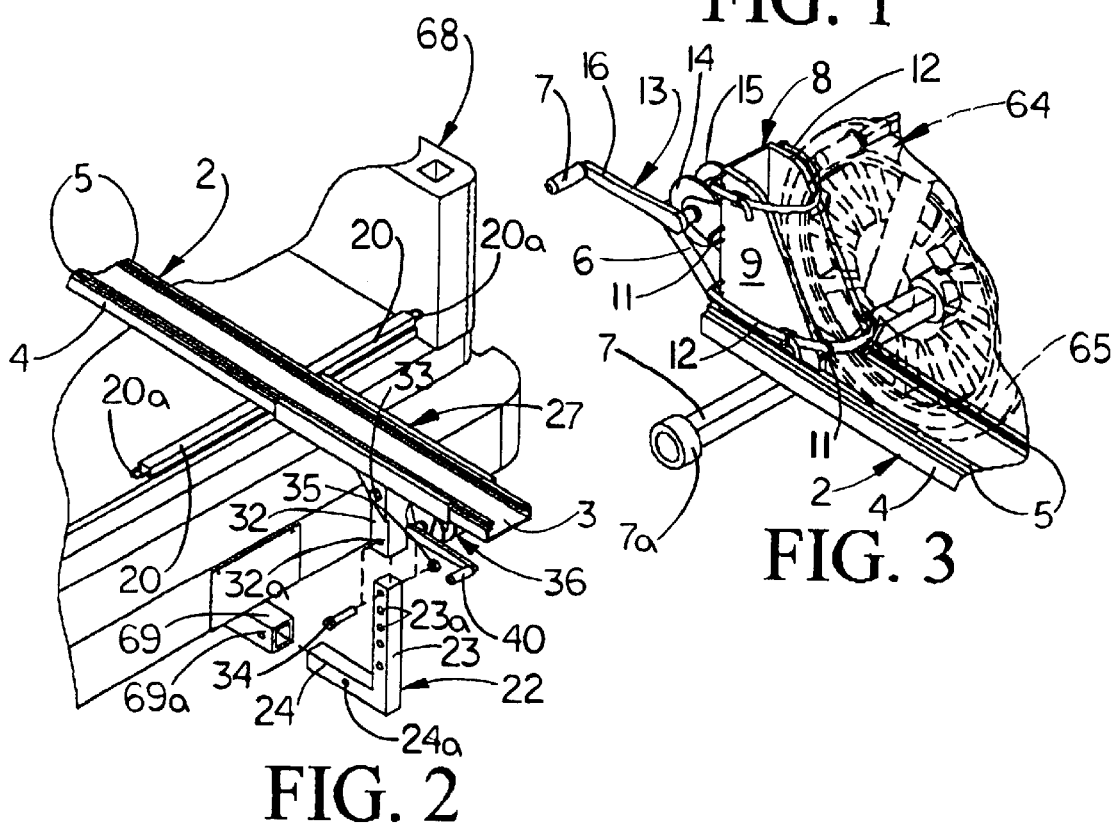
FIG. 2
FIG. 3

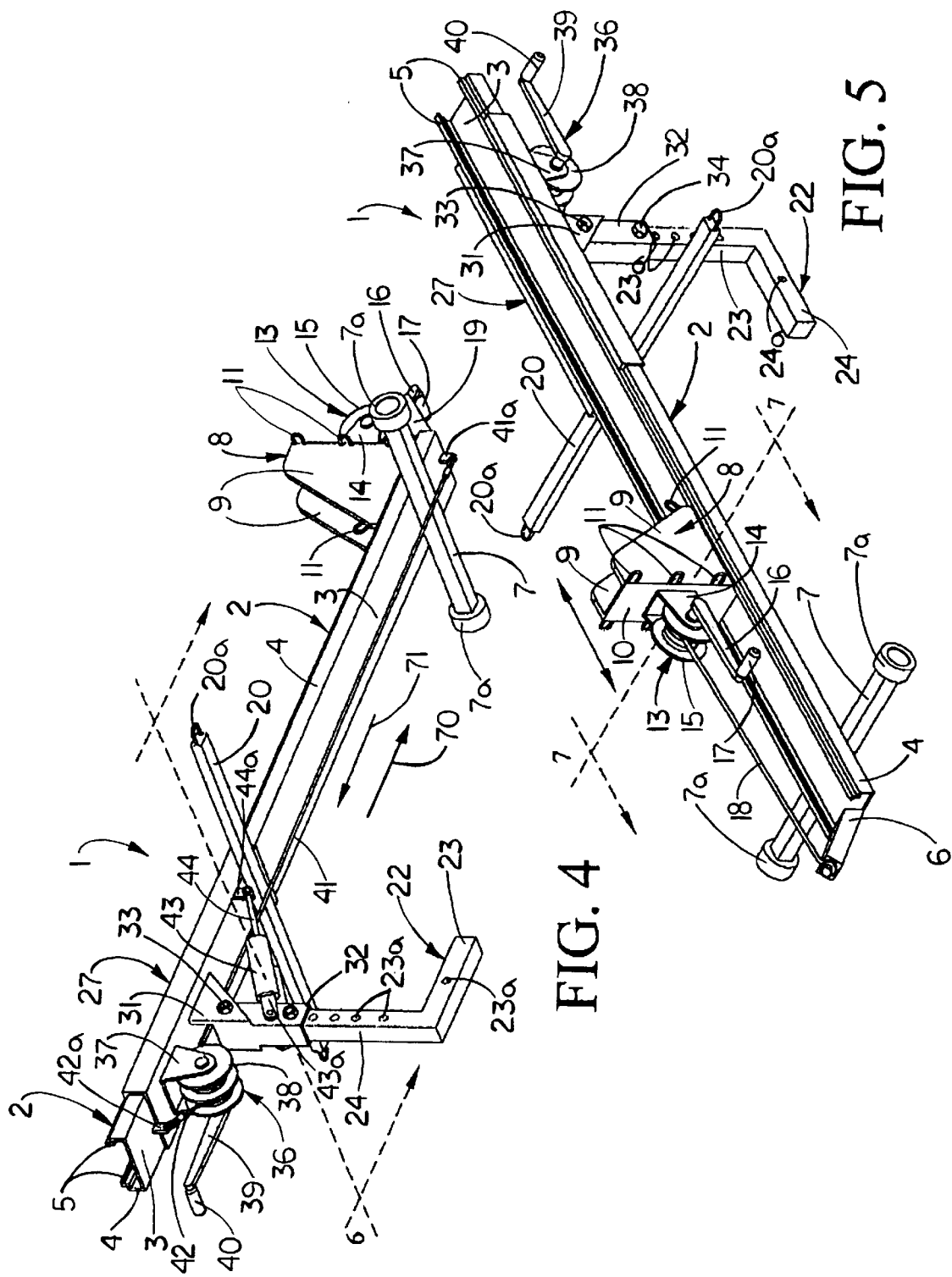

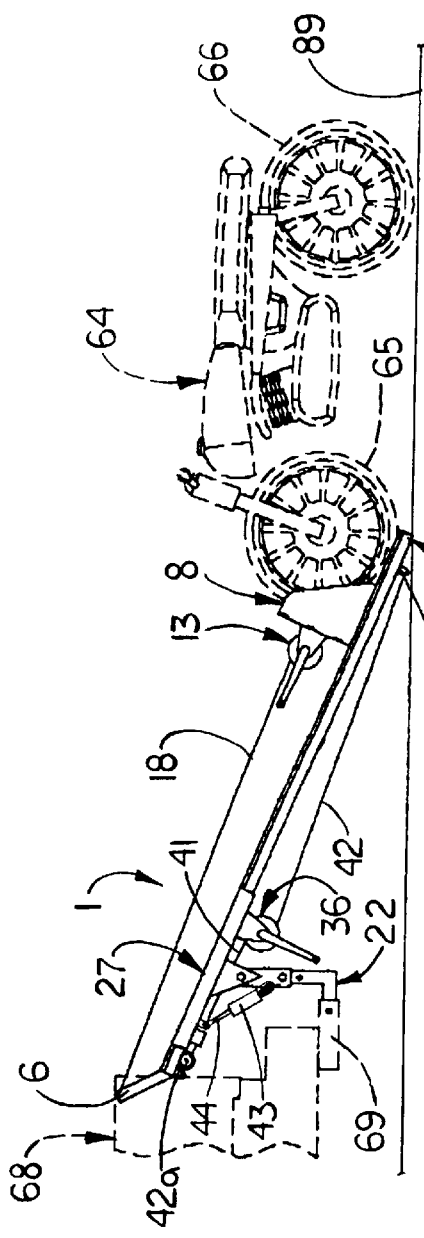
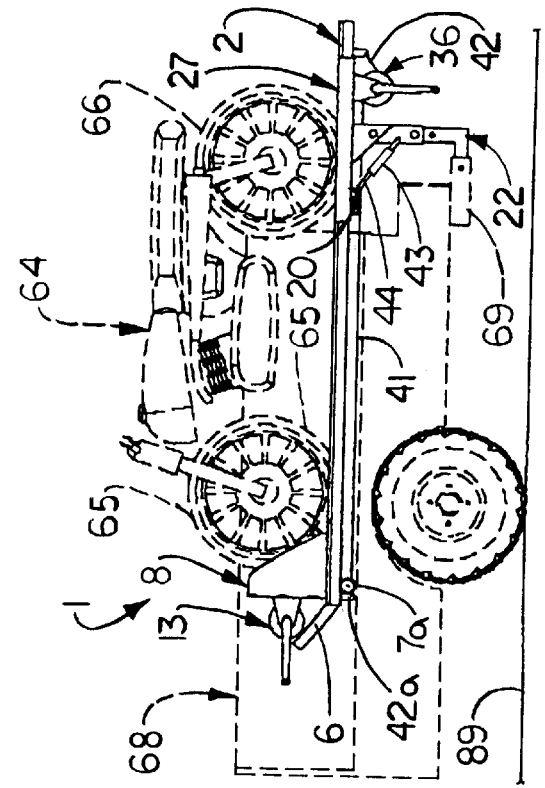
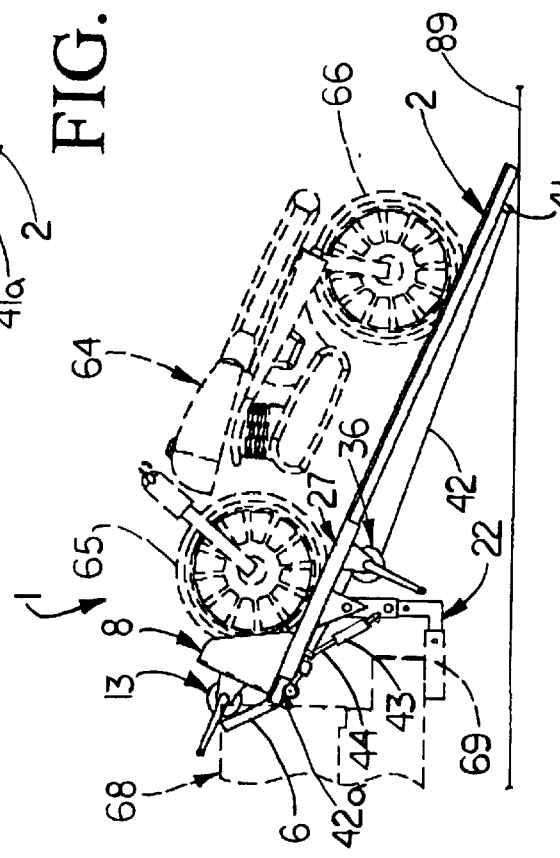
FIG. 8
FIG. 9
FIG. 10

MOTORCYCLE LOADING & UNLOADING APPARATUS

BACKGROUND OF THE INVENTION

FIELD OF THE INVENTION

This invention relates to apparatus for loading and unloading objects, particularly motorcycles, all-terrain vehicles (ATVs) and the like, on a carrying vehicle. More particularly, the invention relates to a motorcycle loading and unloading apparatus including at least one vehicle attachment mount arm for engaging the carrying vehicle. A slide bracket is pivotally carried by the vehicle attachment mount arm, and a support having front and rear ends is slidably carried by the slide bracket. A first winch engages the support for selectively sliding the support forwardly or rearwardly on the slide bracket. A carriage is slidably carried by the support for receiving the object. A second winch operably engages the carriage such that the carriage slidably traverses the support toward the front end of the support responsive to a forward operation of the second winch, and the carriage slidably traverses the support toward the rear end of the support responsive to a reverse operation of the second winch. Accordingly, the apparatus is capable of loading a motorcycle on the carrying vehicle, wherein the carriage is adjusted to the rear end of the support, the support is adjusted rearwardly on the slide bracket and the slide bracket pivots rearwardly to rest the rear end of the support on the ground. The carriage receives the motorcycle, and the second winch is operated to advance the carriage forwardly on the support and pull the motorcycle onto the support. The first winch is then operated to slide the support forwardly on the slide bracket and pull the support and motorcycle onto the carrying vehicle as the support pivots forwardly. The motorcycle is unloaded from the vehicle by reversing those steps.

A well-known and frequently-encountered problem in transporting motorcycles or ATVs is the requirement of lifting the vehicles into a carrying vehicle such as a pickup truck. Because the vehicles are very heavy, this operation requires multiple persons and can result in back strains and other injury to the loading and unloading personnel. Trailers are commonly used to transport motorcycles but require transport and parking space in addition to that required by the towing vehicle.

Several devices are known in the art for lifting a motorcycle or other heavy object onto a carrying vehicle. Patents of interest in this regard include U.S. Pat. Nos. 3,843,001; 5,456,564; 5,462,398; 5,647,719; 5,846,047; 6,099,232; and 6,176,672.

SUMMARY OF THE INVENTION

The invention is an apparatus capable of loading and unloading objects, particularly motorcycles, all-terrain vehicles (ATVs) and the like, on a carrying vehicle. The motorcycle loading and unloading apparatus typically includes at least one vehicle attachment mount arm for engaging the carrying vehicle. A slide bracket is pivotally carried by the vehicle attachment mount arm, and a support having front and rear ends is slidably carried by the slide bracket. A first winch engages the support for selectively sliding the support forwardly or rearwardly on the slide bracket. A carriage is slidably carried by the support for receiving the object. A second winch operably engages the carriage such that the carriage slidably traverses the support toward the front end of the support responsive to a forward operation of the second winch, and the carriage slidably traverses the support toward the rear end of the support responsive to a reverse operation of the second winch. Accordingly, the apparatus is capable of loading a motorcycle on the carrying vehicle, wherein the carriage is adjusted to the rear end of the support, the support is adjusted rearwardly on the slide bracket and the slide bracket pivots rearwardly to rest the rear end of the support on the ground. The carriage receives the motorcycle, and the second winch is operated to advance the carriage forwardly on the support and pull the motorcycle onto the support. The first winch is then operated to slide the support forwardly on the slide bracket and pull the support and motorcycle onto the carrying vehicle as the support pivots forwardly. The motorcycle is unloaded from the vehicle by reversing those steps.

BRIEF DESCRIPTION OF THE DRAWINGS

The invention will be better understood by reference to the accompanying drawings, wherein:

FIG. 1 is a perspective view of an illustrative embodiment of the motorcycle loading and unloading apparatus of this invention, attached to a carrying vehicle (in phantom) and supporting a motorcycle (in phantom) on the vehicle;

FIG. 2 is an exploded, perspective view, partially in section, of the apparatus, more particularly illustrating removable attachment of the apparatus to a carrying vehicle in one embodiment of the apparatus;

FIG. 3 is a perspective view, partially in section, of the motorcycle loading and unloading apparatus, with the front wheel of a motorcycle attached by means of straps to the carriage component of the apparatus;

FIG. 4 is a bottom perspective view of another illustrative embodiment of the motorcycle loading and unloading apparatus of this invention;

FIG. 5 is a top perspective view of the motorcycle loading and unloading apparatus illustrated in FIGS. 1–3;

FIG. 8 is a side view of the motorcycle loading and unloading apparatus, attached to a carrying vehicle (in phantom) and positioned for receiving a wheel of a motorcycle (in phantom) preparatory to loading the motorcycle on the vehicle;

FIG. 9 is a side view of the motorcycle loading and unloading apparatus, with the motorcycle pulled onto the support component of the apparatus by operation of the carriage;

FIG. 10 is a side view of the motorcycle loading and unloading apparatus, with the motorcycle fully-loaded on the vehicle;

DESCRIPTION OF THE EMBODIMENTS

Figures 6, 7:
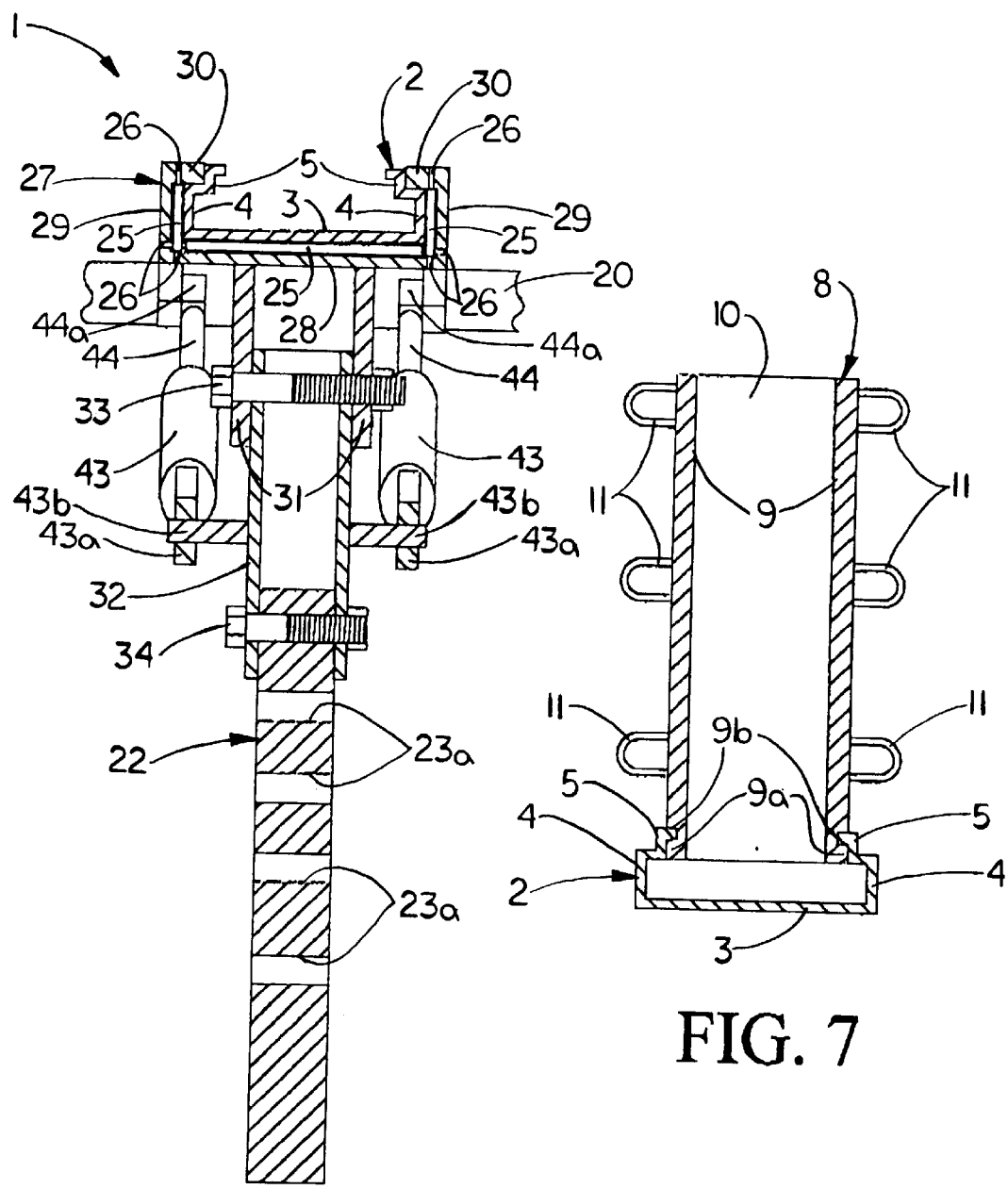
FIG. 6 is a sectional view, taken along section lines 6—6 in FIG. 4, of the motorcycle loading and unloading apparatus.
FIG. 7 is a sectional view, taken along section lines 7—7 in FIG. 5, of the carriage component of an illustrative embodiment of the motorcycle loading and unloading apparatus.

Referring initially to FIGS. 8–10 of the drawings, an illustrative embodiment of the motorcycle loading and unloading apparatus, hereinafter referred to as the apparatus, of this invention is generally illustrated by reference numeral 1. Briefly, the apparatus 1 is capable of loading a motorcycle 64 or other object from a surface 89 into the bed of a pickup truck or other carrying vehicle 68 for transport in the vehicle 68 and unloading the motorcycle 64 or other object from the vehicle 68 to the surface 89. Accordingly, the motorcycle 64 or other object is initially attached to a carriage 8 mounted for selective bidirectional travel on a support 2, with the rear end of the support 2 typically resting on the surface 89. The carriage 8 and attached motorcycle 64 or other object are pulled up the sloped support 2, as illustrated in FIG. 9, by operation of a hoist mechanism. The support 2, with the motorcycle 64 or other object supported thereon, is then pulled into the vehicle 68 by operation of a hoist mechanism as the support 2 pivots with respect to the vehicle 68 and rests in the bed of the vehicle 68, as illustrated in FIG. 10.

Figure 18:
FIG. 18 is a side view of still another illustrative embodiment of the motorcycle loading and unloading apparatus, in typical application of the apparatus.

Referring next to FIGS. 2 and 18 and initially to FIGS. 4–7 of the drawings, the apparatus 1 includes a support 2 which may be an elongated channel beam and, as illustrated in cross-section in FIG. 6, typically has a beam bottom 3 of selected width, parallel beam sides 4 extending from the respective edges of the beam bottom 3, and beam flanges 5 which typically extend inwardly toward each other from the respective beam sides 4. Alternatively, the support 2 may be any structure suitable for the purpose. A front support leg 7 for supporting the front end portion of the support 2 in the vehicle 68 as hereinafter described, may be welded, bolted or otherwise fixedly or removably attached to the beam bottom 3 of the support 2, or a pair of front support legs 7 may extend from the respective beam sides 4 (not illustrated), and a leg foot 7a typically terminates the support leg 7 or support legs 7. A carriage 8, which may include a pair of parallel carriage side plates 9 joined by a carriage front plate 10 but may have any alternative design suitable for its purpose, is slidably or rollably mounted on the support 2 as hereinafter described. Accordingly, as illustrated in FIG. 7, the bottom end portion of each of the respective side plates 9 of the carriage 8 may include an elongated plate groove 9b which receives the corresponding beam flange 5 of the support 2 and defines a plate flange 9a that engages the beam flange 5, to slidably mount the wheel carriage 8 on the support 2. It is understood that any other suitable mechanism known to those skilled in the art other than that described above with respect to the beam flanges 5 of the support 2 and the plate 2, including the use of roller bearings (not illustrated) and/or alternative configurations for the beam flanges 5 and the companion plate flanges 9a, in non-exclusive particular. The carriage 8 may be fitted with multiple strap loops 11 typically extending outwardly from the respective carriage front plate 10 or carriage side plates 9, for securing the front wheel 65 (FIG. 8) of a motorcycle 64 or other object to the carriage 8 as hereinafter described. As further illustrated in FIG. 5, in one embodiment of the apparatus 1, the carriage winch mount bracket 14 of a carriage winch 13 is mounted on the carriage front plate 10 of the carriage 8, and a carriage winch spool 15 is rotatably mounted in the carriage winch mount bracket 14. A carriage winch crank 16, typically fitted with a handle 17, extends through the carriage winch mount bracket 14 and engages the carriage winch spool 15 for selective clockwise or counterclockwise rotation of the carriage winch spool 15 in the carriage winch mount bracket 14. A winch cable mount 6 may extend from the front end of the support 2, and the extending end of a carriage winch cable 18 wound on the carriage winch spool 15 of the carriage winch 13 is secured to the winch cable mount 6. Accordingly, the carriage 8 is adapted for forwardly traversing the support 2 toward the winch cable mount 6 as the shortening carriage winch cable 18 is wound on the carriage winch spool 15 by rotation of the carriage winch crank 16 in one direction, whereas the carriage 8 can be caused to rearwardly traverse the support 2 away from the winch cable mount 6 under the influence of gravity, for example, as the lengthening winch cable 18 is extended from the carriage winch spool 15 by rotation of the winch crank 16 in the opposite direction as hereinafter further described. In another embodiment (not illustrated) of the apparatus 1, the hand-operated carriage winch 13 is replaced by a motorized winch (not illustrated) of selected design, according to the knowledge of those skilled in the art.

In still another embodiment of the apparatus 1 illustrated in FIG. 18, a winch mount 99 is provided on the support 2 at or adjacent to the front end thereof, and the carriage winch mount bracket 14 of the carriage winch 13 is mounted on the winch mount 99. The carriage winch cable 18 extends from the carriage winch spool 15, rotatably mounted in the carriage winch mount bracket 14, and is attached typically to the carriage front plate 10 or other element of the carriage 8. Accordingly, the carriage winch 13 remains stationary on the winch mount 99 as the carriage winch 13 is operated to facilitate movement of the carriage 8 along the support 2 as heretofore described. It is understood that the hand-operated carriage winch 13 can be replaced on the winch mount 99 by a motorized winch (not illustrated), according to the knowledge of those skilled in the art.

As illustrated in FIGS. 4–6, the support 2 is slidably or rollably mounted for selective bidirectional movement in a slide bracket 27 which, as illustrated in FIG. 6, may include a bracket bottom 28 having a pair of parallel bracket sides 29 extending therefrom and inwardly-facing bracket flanges 30 extending from the bracket sides 29. Slide rollers 25 may be rotatably mounted in the slide bracket 27 by means of respective pairs of roller pins 26, which slide rollers 25 may be interposed between the beam sides 4 of the support 2 and the respective bracket sides 29 of the slide bracket 27 and/or between the beam bottom 3 of the support 2 and the bracket bottom 28 of the slide bracket 27, to facilitate substantially unhindered bidirectional sliding of the support 2 through the slide bracket 27. It is understood that slide rollers 25 of various design can be mounted in the slide bracket 27 in any suitable alternative configuration, according to the knowledge of those skilled in the art, in order to achieve that purpose. In another embodiment (not illustrated) of the apparatus 1, the slide rollers 25 are omitted from the slide bracket 27, and the bracket bottom 28, bracket sides 29 and bracket flanges 30 of the slide bracket 27 directly engage the corresponding elements of the support 2. It is further understood that any desired configuration of the beam flanges 5 and the companion bracket flanges 30 suitable for slidably mounting the support 2 in the slide bracket 27 can be used for the purpose. As further illustrated in FIGS. 4 and 5, a rear support leg 20, the ends of which are typically fitted with respective strap loops 20a, may be welded or otherwise fixedly or removably attached to the bracket bottom 28 of the slide bracket 27 for purposes hereinafter described. A pair of parallel receptacle flanges 31 may extend downwardly from the bracket bottom 28 of the slide bracket 27, as particularly illustrated in FIG. 6, in which case the receptacle flanges 31 receive the upper end of a mount arm receptacle 32. A pivot bolt 33 extends through registering bolt openings (not illustrated) provided in the receptacle flanges 31 and in the mount arm receptacle 32, to pivotally mount the slide bracket 27 on the mount arm receptacle 32. Alternative arrangements for pivotally mounting the slide bracket 27 on the mount arm receptacle 32 may be used. Accordingly, the slide bracket 27 and mounted support 2 are capable of pivoting on the mount arm receptacle 32, between the angled or sloped position illustrated in FIG. 9 and the substantially horizontal position illustrated in FIG. 10 in operation of the apparatus 1 as hereinafter described.

As illustrated in FIG. 2, in one embodiment of the apparatus 1 the vertical segment 23 of an L-shaped mount arm 22 is inserted in the open lower end of the mount arm receptacle 32, which vertical segment 23 may be fitted with multiple, spaced-apart pairs of adjustment openings 23a. Alternatively, it is understood that the vertical segment 23 of the mount arm 22 may be fixedly attached to or formed in one piece with the mount arm receptacle 32 and sized to accommodate a vehicle 68 of a given size. In typical application of the apparatus 1 as hereinafter described, the apparatus 1 is mounted on the pickup truck or other carrying vehicle 68 by inserting the horizontal segment 24 of the mount arm 22 in the rearwardly-extending hitch receptacle 69 on the carrying vehicle 68. A bolt (not illustrated) is extended through a bolt opening 69a provided in the hitch receptacle 69 and through a registering bolt opening 24a provided in the horizontal segment 24 of the mount arm 22, to removably secure the mount arm 22 on the carrying vehicle 68. A height adjustment bolt 34 is extended through a pair of bolt openings 32a provided in the mount arm receptacle 32 and through a selected pair of the adjustment openings 23a provided in the vertical segment 23 of the mount arm 22, and typically receives a nut 35 to mount the slide bracket 27 and support 2 at a selected height with respect to the ground.

As illustrated in FIG. 4, the winch mount bracket 37 of a loading winch 36 may be mounted on the bracket bottom 28 of the slide bracket 27, typically behind the mount arm receptacle 32, and typically includes a dual cable winch spool 38 rotatably mounted in the winch mount bracket 37. A dual cable winch crank 39, typically fitted with a handle 40, extends through the winch mount bracket 37 and engages the dual cable winch spool 38 for selective clockwise or counterclockwise rotation thereof. A front cable 41 wound on the dual cable winch spool 38 extends forwardly from the loading winch 36 and is attached to a front cable anchor 41a, provided on the beam bottom 3 of the support 2, typically at or adjacent to the front end of the support 2. A rear cable 42, also wound on the dual cable winch spool 38, extends rearwardly from the loading winch 36 and is attached to a rear cable anchor 42a, provided on the bottom beam 3 of the support 2, typically at or adjacent to the rear end of the support 2. Accordingly, as illustrated in FIG. 4, rotation of the dual cable winch spool 38 in one direction using the dual cable winch handle 40 facilitates unwinding of the wound rear cable 42 from the dual cable winch spool 38 and simultaneous winding of the front cable 41 on the dual cable winch spool 38, whereupon the shortening front cable 41 pulls the support 2 rearwardly through the stationary slide bracket 27, as indicated by the reverse arrow 71 in FIG. 4. Conversely, rotation of the dual cable winch spool 38 in the opposite direction facilitates unwinding of the wound front cable 41 from the dual cable winch spool 38 and simultaneous winding of the rear cable 42 on the dual cable winch spool 38, whereupon the shortening rear cable 42 pulls the support 2 forwardly through the slide bracket 27, as indicated by the forward arrow 70 in FIG. 4. In another embodiment (not illustrated) of the apparatus 1, the hand-operated loading winch 36 is replaced by a motorized winch (not illustrated) of selected design, according to the knowledge of those skilled in the art.

In one embodiment of the apparatus 1 illustrated in FIGS. 4 and 6, at least one air cylinder 43 is pivotally attached to a corresponding side of the mount arm receptacle 32 by means of a pivot pin 43b, which extends through a cylinder flange 43a of the air cylinder 43, as illustrated in FIG. 6, to cushion the support 2 as the support 2 pivots on the mount arm receptacle 32 from the angled or sloped position of FIG. 9 to rest in the substantially horizontal position on the vehicle 68 as illustrated in FIG. 10. A cylinder piston 44 is extendible from the air cylinder 43 and is pivotally attached to the beam bottom 3 of the support 2 by means of a pivot pin (not illustrated) which extends through the cylinder piston 44 and through a pin opening (not illustrated), provided in a piston flange 44a which extends from the beam bottom 3. Alternatively, the cylinder piston 44 can be pivotally mounted on the rear support leg 20 according to the knowledge of those skilled in the art. In another embodiment of the apparatus 1, illustrated in FIG. 5, the air cylinder or cylinders 43 and respective cylinder pistons 44 are omitted from the mount arm receptacle 32 and slide bracket 27 or rear support leg 20. In that embodiment, the pivoting components of the slide bracket 27 and mount arm receptacle 32 may be fitted with springs (not illustrated) or other mechanisms known to those skilled in the art for cushioning the pivoting support 2 on the vehicle 68. It is understood that the air cylinder 43 or cylinders 43 can be replaced by hydraulic cylinders, as desired, according to the knowledge of those skilled in the art.

Referring next to FIGS. 1–3 and 8–10 of the drawings, in typical application of the invention, the apparatus 1 is initially mounted on the hitch receptacle 69 of a pickup truck or other suitable carrying vehicle 68. Accordingly, as illustrated in FIG. 2, the horizontal segment 24 of the mount arm 22 is initially inserted in the rearwardly-extending hitch receptacle 69 of the vehicle 68, after which a lock pin or bolt (not illustrated) is inserted or threaded through bolt openings 69a provided in the hitch receptacle 69 and registering bolt openings 24a provided in the mount arm 22. The upper end of the vertical segment 23 of the mount arm 22 is next inserted in the open lower end of the mount arm receptacle 32. As the mount arm receptacle 32 is lowered on the mount arm 22, the rear support leg 20 and front support leg 7 of the support 2 are rested on the bed of the vehicle 68, and the height adjustment bolt 34 is then extended through the appropriate pair of the adjustment openings 23a and through the registering bolt opening 32a provided in the mount arm receptacle 32, and typically receives a nut 35 to secure the support 2 in resting configuration in the bed of the vehicle 68. Alternatively, the vertical segment 23 of the mount arm 22 may be fixedly secured to or formed in one piece with the mount arm receptacle 32 and sized to fit one of a variety of different-sized vehicles 68. Next, the loading winch 36 is operated to slide or roll the support 2 rearwardly through the stationary slide bracket 27, by winding the front cable 41 on the loading winch 36 as the rear cable 42 is unwound from the loading winch 36, as heretofore described with respect to FIG. 4. As the center of gravity of the rearwardly-sliding or rolling support 2 traverses the fulcrum defined by the receptacle flanges 31 of the slide bracket 27, the slide bracket 27 pivots rearwardly and the cylinder piston or pistons 44 extend from the respective air cylinder or cylinders 43 until the rear end of the support 2 typically rests on the ground 89, as illustrated in FIG. 8. The carriage 8 is then caused to rearwardly traverse the support 2 from the front or winch cable mount 6 end thereof by unwinding the carriage winch cable 18 from the carriage winch 13, as further illustrated in FIG. 8. The front wheel 65 of the motorcycle 64 is then positioned between the parallel carriage side plates 9 of the carriage 8, after which one or more front attachment straps 12 may be extended through the strap loops 11 of the carriage 8 and extended through the front wheel 65 of the motorcycle 64 and fastened, to secure the motorcycle 64 to the carriage 8. Next, the carriage winch 13 is operated to wind the carriage winch cable 18 on the carriage winch 13, to pull the carriage 8 and attached motorcycle 64 up the inclined support 2 until the motorcycle 64 rests entirely on the support 2, as illustrated in FIG. 9. Accordingly, the front wheel 65 and rear wheel 66 of the motorcycle 64 typically rest on the beam bottom 3 (FIG. 6) inside the support 2. Finally, the loading winch 36 is operated to simultaneously wind the rear cable 42 thereon and unwind the front cable 41 therefrom, whereupon the support 2 slides or rolls forwardly through the slide bracket 27 as heretofore described with respect to FIG. 4. As the center of gravity of the support 2 again traverses the fulcrum defined by the receptacle flanges 31 of the slide bracket 27, the slide bracket 27 pivots on the mount arm receptacle 32 as the leg feet 7a of the front support leg 7 and the rear support leg 20 of the support 2 are lowered to rest on the bed of the vehicle 68, as illustrated in FIG. 10. Simultaneously, the cylinder piston or pistons 44 of the apparatus 1 illustrated in FIG. 4 are pushed into the respective air cylinder or cylinders 43, to cushion the support 2 as the support 2 pivots with the slide bracket 27 from the angled position of FIG. 9 to the fully-loaded position of FIG. 10. As illustrated in FIG. 1, one or more rear attachment straps 12a may be extended through one or both strap loops 20a of the rear support 20 and extended through the rear wheel 66 or other element of the motorcycle 64 and fastened to further secure the motorcycle 64 on the support 2. The motorcycle 64 is unloaded from the vehicle 68, as desired, by initially operating the loading winch 36 to advance the support 2 rearwardly through the slide bracket 27 and rest the slide bracket 2 on the ground, as illustrated in FIG. 9; and then operating the carriage winch 13 to lower the carriage 8 and attached motorcycle 64 by gravity on the support 2 until the motorcycle again rests on the ground 89 as illustrated in FIG. 10.

Figure 12:
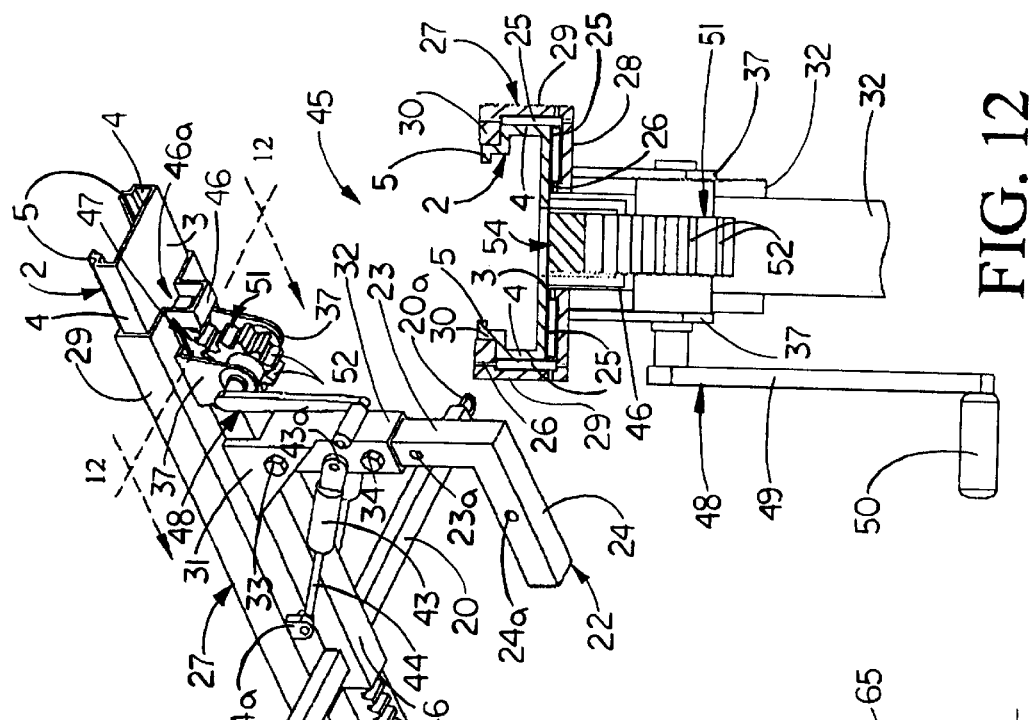
FIG. 12 is a sectional view, taken along section lines 12—12 in FIG. 11, of the motorcycle loading and unloading apparatus.
Figure 11:
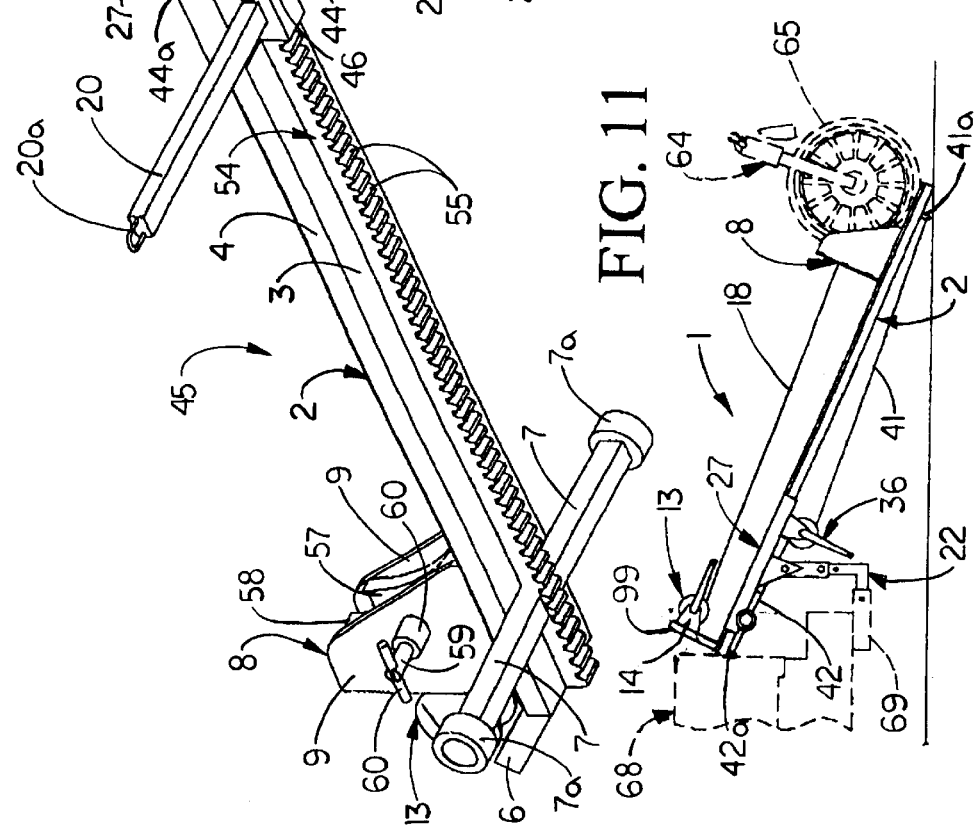
FIG. 11 is a bottom perspective view of another illustrative embodiment of the motorcycle loading and unloading apparatus.

Referring next to FIGS. 11 and 12 of the drawings, in another embodiment of the apparatus generally illustrated by reference numeral 45, the cable-operated loading winch 36 described above with respect to the apparatus 1 illustrated in FIGS. 1–10 is replaced by a pinion winch 48 which engages a rack 54 provided on the bottom surface of the support 2 for selective bidirectional rolling or sliding of the support 2 through the slide bracket 27. Accordingly, the rack 54 is provided with multiple rack teeth 55 and extends through the rack channel 46a of a channel bracket 46, provided on the bottom surface of the slide bracket 27. A winch crank 49, typically fitted with a winch handle 50, extends through the winch mount bracket 37 and engages the pinion 51 for rotation of the pinion 51 in the winch mount bracket 37. A pinion opening 47 is provided in the channel bracket 46, and multiple pinion teeth 52 of the pinion 51 extend through the pinion opening 47 and mesh with the rack teeth 55 of the rack 54. Accordingly, by rotation of the winch crank 49, the pinion teeth 52 of the pinion 51 progressively engage the rack teeth 55 of the rack 54, thereby facilitating selective bidirectional travel of the support 2 through the slide bracket 27 as heretofore described with respect to operation of the loading winch 36 of the apparatus 1 illustrated in FIGS. 1–10. It is understood that the pinion winch 48 of the apparatus 45 can be either hand-operated as described, or motorized, as heretofore described with respect to the loading winch 36 of the apparatus 1.

Figure 13:
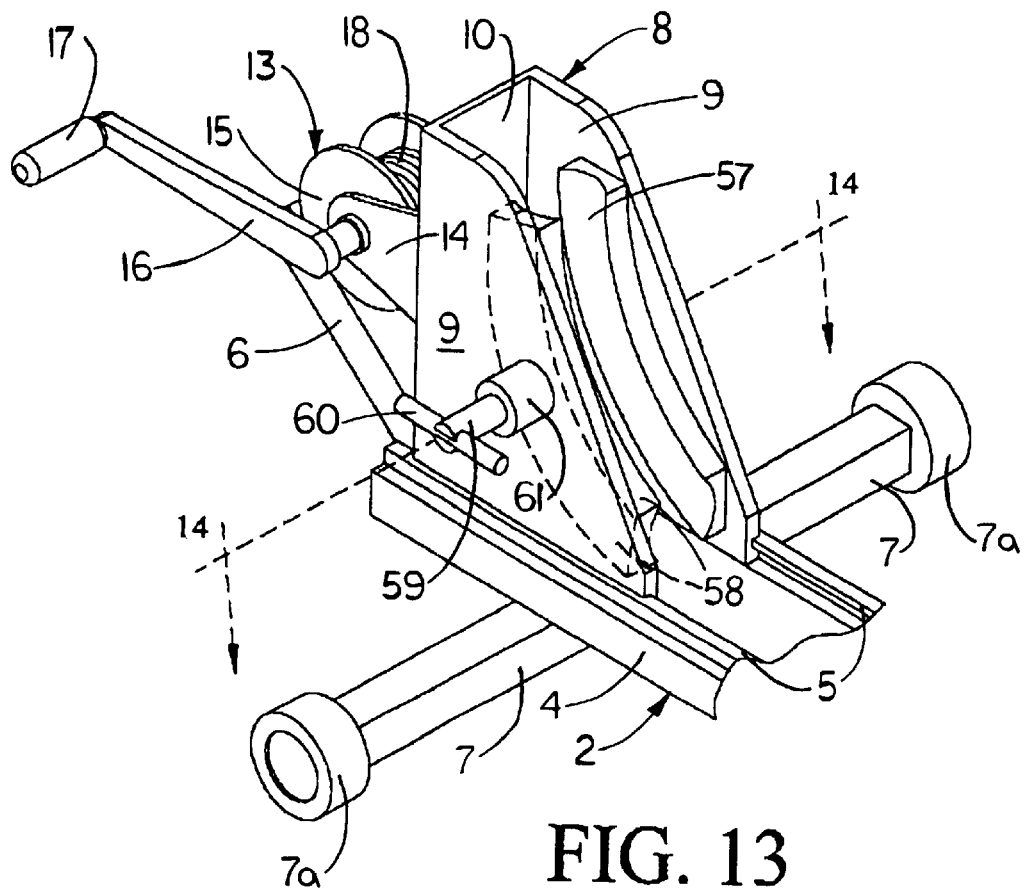
FIG. 13 is a perspective view, in section, of another illustrative embodiment the motorcycle loading and unloading apparatus, with an alternative mechanism for securing a motorcycle wheel in the carriage.
Figure 14:
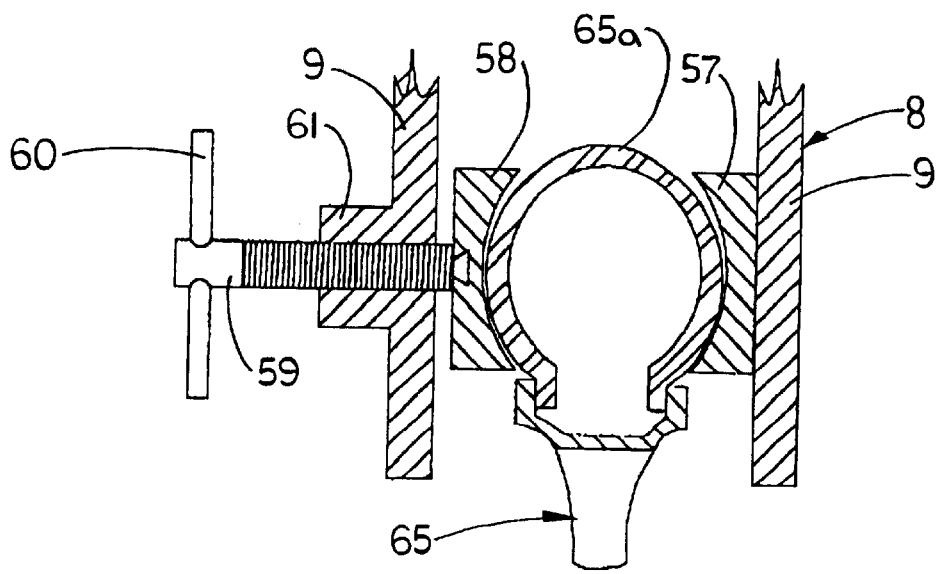
FIG. 14 is a sectional view, taken along section lines 14—14 in FIG. 13, of the motorcycle loading and unloading apparatus.

Referring again to FIG. 11 and to FIGS. 13 and 14 of the drawings, the carriage 8 of the apparatus 1 illustrated in FIGS. 1–10 or of the apparatus 45 illustrated in FIG. 11 may be provided with an alternative mechanism for securing the front wheel 65 (FIG. 3) of the motorcycle 64 in the carriage 8. Accordingly, a typically arcuate rubber, plastic or metal fixed wheel pad 57, which may be continuous or segmented, is provided on the inside surface of one of the carriage side plates 9 of the carriage 8, while a similar, arcuate adjusting wheel pad 58 is provided on the end of a threaded shaft 59 that extends through a shaft collar 61 provided on the opposite carriage side plate 9. The threaded shaft 59 may be fitted with a shaft handle 60 to facilitate threaded advancement of the threaded shaft 59 through the shaft collar 61 and advancement of the adjusting wheel pad 58 toward the fixed wheel pad 57. Accordingly, the front wheel 65 of the motorcycle 64 is removably secured in the carriage 8 by positioning the front tire 65a of the motorcycle 64 between the fixed wheel pad 57 and the adjusting wheel pad 58 and advancing the adjusting wheel pad 58 against the front tire 65a until the front tire 65a is securely interposed or sandwiched between the fixed wheel pad 57 and the adjusting wheel pad 58. The front wheel 65 is removed from the carriage 8 by loosening the threaded shaft 59 in the shaft collar 61 to remove the adjusting wheel pad 58 from contact with the front tire 65a. It is understood that the fixed wheel pad 57 and the adjusting wheel pad 58 may be used alone or in combination with the strap loops 11 (FIG. 3) and the front attachment straps 12, as desired, or any other suitable mechanism known to those skilled in the art may be used alone or in combination with those mechanisms in order to secure the motorcycle 64 to the carriage 8.

Figure 15:
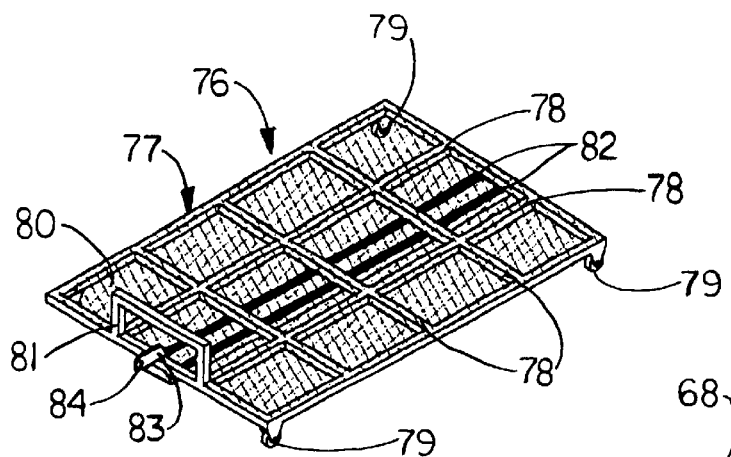
FIG. 15 is a front perspective view of an ATV adaptor plate adapted for attachment to the motorcycle loading and unloading apparatus for loading and unloading an all-terrain vehicle (ATV) on the carrying vehicle.
Figure 16:
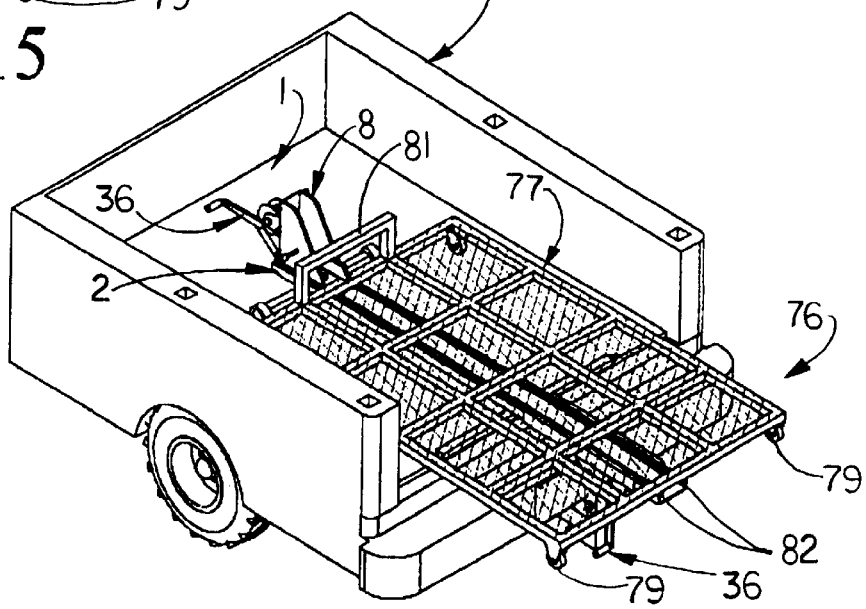
FIG. 16 is a rear perspective view of the ATV adaptor plate illustrated in FIG. 15, with the ATV adaptor plate attached to the motorcycle loading and unloading apparatus and disposed in the loaded configuration in a carrying vehicle.
Figure 17:
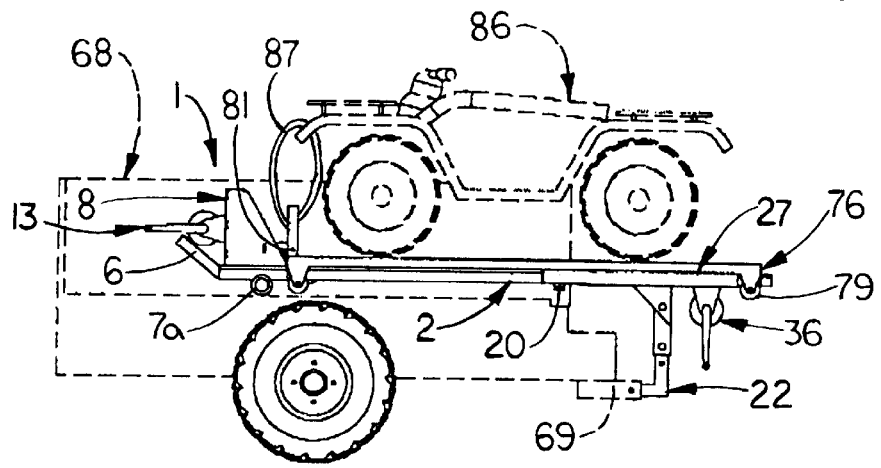
FIG. 17 is a side view of a motorcycle loading and unloading apparatus of this invention, with the ATV adaptor plate attached to the apparatus and an all-terrain vehicle resting on the ATV adaptor plate after loading of the ATV in the carrying vehicle using the apparatus and the adaptor plate.

Referring next to FIGS. 15–17 of the drawings, the various embodiments of the apparatus 1 and the apparatus 45 of this invention may be fitted with an ATV adaptor plate 76 to facilitate loading and unloading an all-terrain vehicle (ATV) 86 on a pickup truck or other carrying vehicle 68. The ATV adaptor plate 76 includes a frame 77 of selected size and shape, typically having a network of frame braces 78 which support a mesh 80. The frame 77 may be fitted with wheels 79 for purposes hereinafter described. A pair of slide flanges 82, which may be similar in design to the plate flanges 9a (FIG. 7) of the carriage 8, are typically provided on the bottom surface of the frame 77 for slidably or rollably engaging the companion beam flanges 5 (FIG. 7) of the support 2 and slidably or rollably mounting the frame 77 on the support 2, as hereinafter described. An attachment flange 83, typically provided with a pin opening 84, may extend forwardly from the front end of the frame 77 to facilitate attachment of the frame 77 to the carriage 8 of the apparatus 1. A tie bar 81 of selected shape and design is typically provided on the front end of the frame 77 for purposes hereinafter described. In typical application of the ATV adaptor plate 76, the frame 77 is initially mounted on the support 2 by engaging the slide flanges 82 with the respective beam flanges 5 (FIG. 7) of the support 2 and sliding the fame 77 on the support 2 until at least the front set of wheels 79 rests on the bed of the vehicle 68, as illustrated in FIG. 16. Next, the attachment flange 83 is positioned between the adjacent carriage side plates 9 of the carriage 8, and a pin (not illustrated) or bolt (not illustrated) is inserted through aligned openings (not illustrated) in the carriage side plates 9 and through the registering pin opening 84 (FIG. 15) of the attachment flange 83, to secure the frame 77 to the carriage 8. By operation of the loading winch 36 (FIG. 17) or pinion winch 48 (FIG. 11), the support 2 rearwardly traverses the slide bracket 27 until the changing center of gravity imparted on the support 2 by the adaptor plate 76 causes the support 2 and slide bracket 27 to pivot rearwardly on the mount arm receptacle 32 and the support 2, with the ATV adaptor plate 76 supported thereon, resting in the sloped configuration illustrated in FIG. 9. A three-wheeled or four-wheeled all-terrain vehicle 86 can then be driven up on the sloped adaptor plate 76, after which the frame or other element of the all-terrain vehicle 86 is attached to the tie bar 81 of the ATV adaptor plate 76 typically by means of one or more attachment straps 87, as illustrated in FIG. 17. Finally, the loading winch 36 or pinion winch 48 (FIG. 11) is operated to pull the support 2, and the all-terrain vehicle 86 resting on the ATV adaptor plate 76, onto the bed of the vehicle 68. The all-terrain vehicle 86 is unloaded from the vehicle 68, as desired, by reverse operation of the loading winch 36 or pinion winch 48 to facilitate reverse movement of the support through the slide bracket 2 and resting of the support 2 and the attached ATV adaptor plate 76 in the sloped, loading configuration. It is understood that the frame 77 can be shorter than that illustrated in FIGS. 15–17, depending on the size of the all-terrain vehicle 86 to be supported thereon, in which case both the front set of wheels 79 and the rear set of wheels 79 typically rest in the bed of the vehicle 68 when the ATV adaptor plate 76 is disposed in the supporting configuration of FIG. 17.

It will be understood by those skilled in the art that the cable-operated carriage winch 13 on any of the embodiments of the apparatus described above may be replaced by a pinion winch sir in design to the pinion winch 48 described above with respect to FIGS. 11 and 12, in which case a rack 54 having rack teeth 55 is provided on the support 2 for engaging pinion teeth 52 provided on a pinion 51 mounted in the carriage winch mount bracket 14 (FIG. 13) of the carriage winch 13. Accordingly, in application of the apparatus the hand-actuated or motorized pinion winch is operated to facilitate selective bidirectional travel of the support 2 through the slide bracket 27 in the same manner as heretofore described with respect to the carriage winch 13. It is further understood that any of the various features of the embodiments described above can be combined with each other in different combinations to assemble an apparatus of selected design. For example, the apparatus 45 described above with respect to FIGS. 11 and 12 may be constructed with or without the air cylinder or cylinders 43 and respective piston or pistons 44, and in the latter case, the pivoting elements of the slide bracket 27 and mount arm receptacle 32 may or may not be fitted with alternative mechanisms for cushioning the support 2 as the support 2 pivots on the slide bracket 27 as heretofore described with respect to FIGS. 9 and 10. As a further example, the strap loops 11 and front attachment straps 12 (FIG. 3) may be used alone or in combination with the fixed wheel pad 57 and the adjusting wheel pad 58 (FIG. 13) on the embodiment of the apparatus 45 illustrated in FIGS. 11 and 12 to secure the front wheel 65 of the motorcycle 64 to the carriage 9. Referring again to FIG. 2 of the drawings, it is understood that the mount arm 2 of any of the embodiments of the apparatus can be adapted for engaging a hitch ball (not illustrated) provided on the carrying vehicle 68.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, I claim:

1. An apparatus for loading and unloading an object on a carrying vehicle, said apparatus comprising:
   at least one vehicle attachment mount arm;
   a slide bracket pivotally carried by said at least one vehicle attachment mount arm;
   a support carried by said slide bracket for bidirectional movement on said slide bracket, said support having a front end and a rear end;
   a first winch provided in stationary relationship with respect to said support, said first winch having a front cable extending forwardly from said first winch and engaging said support and a rear cable extending rearwardly from said first winch and engaging said support;
   wherein said front cable is wound on said first winch and said support traverses said slide bracket in a rearward direction responsive to a rearward operation of said first winch, and said rear cable is wound on said first winch and said support traverses said slide bracket in a forward direction responsive to a forward operation of said first winch;
   a carriage carried by said support for receiving the object;
   a second winch operably engaging said carriage; and
   wherein said carriage traverses said support toward said front end of said support responsive to a forward operation of said second winch, and said carriage traverses said support toward said rear end of said support responsive to a reverse operation of said second winch.

2. The apparatus of claim 1 wherein said second winch is mounted on said carriage and comprising a winch cable extending forwardly from said second winch and attached to said support.

3. The apparatus of claim 1 wherein said second winch is mounted on said support and comprising a winch cable extending rearwardly from said second winch and attached to said carriage.

4. The apparatus of claim 1 wherein said vehicle attachment mount arm comprises a horizontal segment for engaging the carrying vehicle, a vertical segment extending from said horizontal segment and a mount arm receptacle provided on said vertical segment, and wherein said slide bracket is pivotally mounted on said mount arm receptacle.

5. The apparatus of claim 1 comprising an ATV adaptor plate coupled to said carriage and engaging said support for receiving the object.

6. The apparatus of claim 1 comprising a fixed pad stationary on said carriage and an adjusting pad adjustably mounted on said carriage in spaced-apart relationship to said fixed pad for engaging the object and securing the object to said carriage.

7. The apparatus of claim 1 comprising at least one attachment loop provided on said carriage and at least one attachment strap engaging said at least one attachment loop for engaging the object and securing the object to said carriage.

8. An apparatus for loading and unloading an object on a carrying vehicle having a hitch receptacle, said device comprising:

a vehicle attachment mount arm having a horizontal segment for insertion in the hitch receptacle of the carrying vehicle and a vertical segment extending from said horizontal segment;

a mount arm receptacle adjustably receiving said vertical segment of said vehicle attachment mount arm;

a slide bracket pivotally carried by said mount arm receptacle;

a support carried by said slide bracket for selective bidirectional movement on said slide bracket, said support having a front end and a rear end;

a first winch provided in stationary relationship with respect to said support and operably engaging said support;

wherein said support traverses said slide bracket in a forward direction responsive to a forward operation of said first winch and said support traverses said slide bracket in a rearward direction responsive to a reverse operation of said first winch;

a carriage carried by said support for receiving the object;

a second winch operably engaging said carriage; and wherein said carriage traverses said support toward said front end of said support responsive to a forward operation of said second winch, and said carriage traverses said support toward said rear end of said support responsive to a reverse operation of said second winch.

9. The apparatus of claim 8 wherein said second winch is mounted on said carriage and comprising a winch cable extending forwardly from said second winch and attached to said support.

10. The apparatus of claim 8 wherein said second winch is mounted on said support and comprising a winch cable extending rearwardly from said second winch and attached to said carriage.

11. The apparatus of claim 8 comprising an ATV adaptor plate coupled to said carriage and engaging said support for receiving the object.

12. The apparatus of claim 8 comprising a fixed pad stationary on said carriage and an adjusting pad adjustably mounted on said carriage in spaced-apart relationship to said fixed pad for engaging the object.

13. The apparatus of claim 8 comprising at least one attachment loop provided on said carriage and at least one attachment strap engaging said at least one attachment loop for engaging the object and securing the object to said carriage.

14. An apparatus for loading and unloading an object on a carrying vehicle, said apparatus comprising:

at least one vehicle attachment mount arm;

a slide bracket pivotally carried by said at least one vehicle attachment mount arm;

a support carried by said slide bracket for selective bidirectional movement on said slide bracket, said support having a front end and a rear end;

a rack having a plurality of rack teeth carried by said support;

a pinion rotatably mounted on said slide bracket and operably engaging said rack teeth of said rack for selectively bidirectionally advancing said support on said slide bracket responsive to rotation of said pinion;

a carriage carried by said support for receiving the object;

a winch operably engaging said carriage; and wherein said carriage traverses said support toward said front end of said support responsive to a forward operation of said winch, and said carriage traverses said support toward said rear end of said support responsive to a reverse operation of said winch.

15. The apparatus of claim 14 wherein said winch is mounted on said carriage and comprising a winch cable extending forwardly from said winch and attached to said support.

16. The apparatus of claim 14 wherein said winch is mounted on said support and comprising a winch cable extending rearwardly from said winch and attached to said carriage.

17. The apparatus of claim 14 wherein said vehicle attachment mount arm comprises a horizontal segment for engaging the carrying vehicle, a vertical segment extending from said horizontal segment and a mount arm receptacle provided on said vertical segment, and wherein said slide bracket is pivotally mounted on said mount arm receptacle.

18. The apparatus of claim 14 comprising an ATV adaptor plate coupled to said carriage and engaging said support for receiving the object.

19. The apparatus of claim 14 comprising a fixed pad stationary on said carriage and an adjusting pad adjustably mounted on said carriage in spaced-apart relationship to said fixed pad for engaging the object.

20. The apparatus of claim 14 comprising at least one attachment loop provided on said carriage and at least one attachment strap engaging said at least one attachment loop for engaging the object and securing the object to said carriage.

* * * * *